June 30, 1959 — L. K. QUICK — 2,892,320
LIQUID LEVEL CONTROL IN REFRIGERATION SYSTEM
Filed May 31, 1955
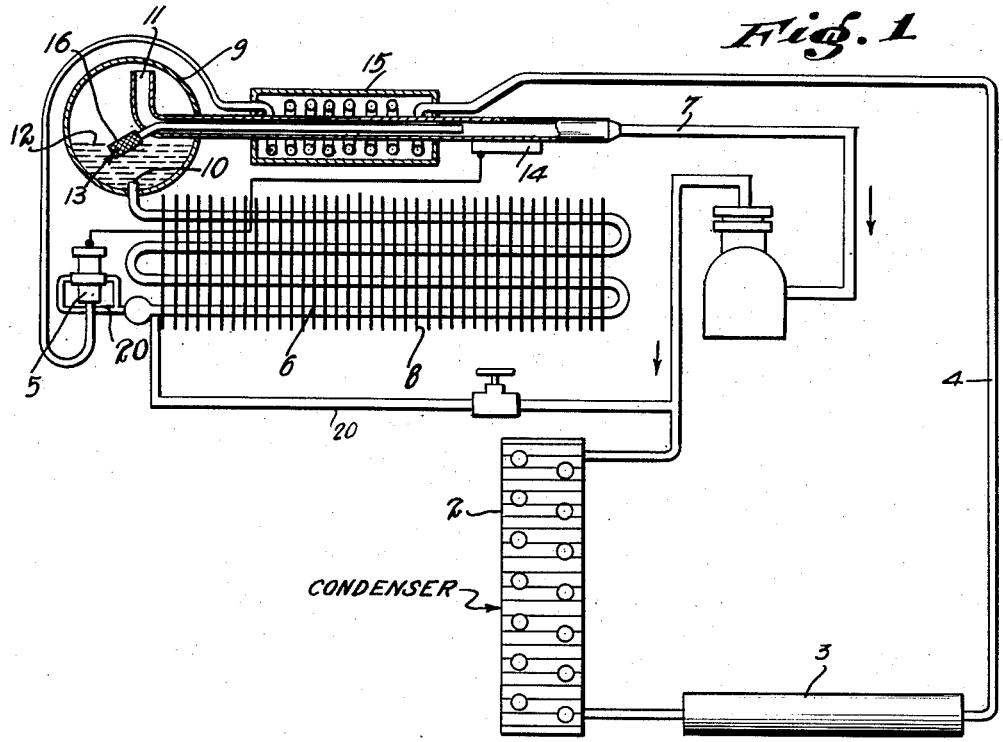
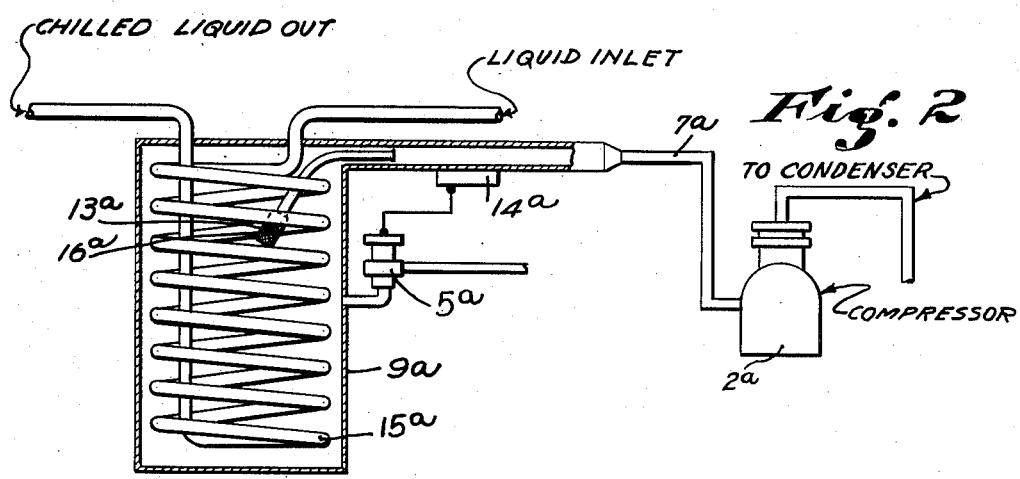
INVENTOR.
LESTER K. QUICK
BY
ATTORNEYS

United States Patent Office 2,892,320
Patented June 30, 1959

2,892,320

LIQUID LEVEL CONTROL IN REFRIGERATION SYSTEM

Lester K. Quick, Eugene, Oreg.

Application May 31, 1955, Serial No. 512,111

4 Claims. (Cl. 62—196)

This invention relates to liquid level controls and is more particularly related to a means for maintaining a liquid level control or a fully flooded evaporator of a refrigeration system.

The efficiency of operation for a refrigeration system is dependent upon the surface exposed to the air stream in order, in the case of the evaporator, to extract heat from the air to volatilize the liquid refrigerant.

The rate of heat transfer from the air through the metal of the evaporator coils to the liquid therein is of course greatest where the heat transfer is to a liquid within the coil.

Many systems have been devised or attempted for the purpose of maintaining what is known in this art as a fully flooded coil. In accordance with my invention I obtain a fully flooded coil or control the level of the liquid refrigerant within the coil by maintaining the operation of the expansion valve in the system such that the expansion valve will remain open to admit liquid refrigerant to the coil to either maintain a flooded coil or maintain the liquid within the coil at the desired point by controlling the operation of the expansion valve by the flooded condition of the coil.

In maintaining a fully flooded coil, I position a heat exchanger in the suction side of the refrigeration system or in the normal gas discharge tube from the evaporator and in this discharge line beyond the said heat exchanger I position the thermostatic control bulb of the expansion valve so that the expansion valve is maintained open under the heated condition of the refrigerant gases.

In order to control the operation of the expansion valve, I then utilize a metered liquid refrigerant supply means which will, under conditions of liquid elevation of the liquid within the evaporator, act to deliver a metered quantity of liquid refrigerant into the discharge line at the point of application of the thermostatic bulb of the expansion valve when the liquid refrigerant in the evaporator builds up to the point above the desired level, the effect of which is to operate the expansion valve to prevent further rise of liquid level within the evaporator.

It is therefore an object of my invention to provide a means fully automatic controlling and maintaining the level of the liquid refrigerant within an evaporator.

Another object of my invention is to provide a simple automatic means for maintaining a definite liquid level of liquid refrigerant in an evaporator coil.

Another object of my invention is to provide for the maintaining of a fully flooded condition of an evaporator coil.

Other objects and advantages of this invention it is believed will be apparent from the following detailed description of a preferred embodiment thereof as illustrated in the accompanying drawings.

In the drawings:

Figure 1 is a diagrammatic illustration of a refrigeration system including liquid level control means embodying my invention.

Figure 2 is a diagrammatic illustration of a modified form of liquid level control embodying my invention.

In accordance with my invention, a liquid level control means is particularly applicable for use in the common refrigeration cycle wherein there is employed a compressor 1 for compressing a refrigerant which is normally gaseous at normal atmospheric temperature and pressure conditions and which refrigerant is cooled in a condenser 2 which may be of any desired construction of many well known types.

The refrigerant leaving the condenser 2 is cooled to a point where it is a liquid and is accumulated or stored normally in a receiver 3 from which it is taken through a suitable conduit 4 to an expansion valve 5 through which the liquid refrigerant is passed to an evaporator 6. In the evaporator 6 the liquid refrigerant takes heat from the surroundings, ordinarily from the air, to convert the liquid refrigerant into a gas. The gaseous refrigerant is then returned through a return or suction line 7 to the compressor 1. The evaporator 6 is ordinarily composed of a series or coil of pipes which may or may not be provided with heat surface fins 8 which increase the surface exposed to the external heat so that a more effective flow of heat from the outside to the refrigerant within the coils may be had.

In accordance with my invention, the discharge from the evaporator 6 is to the lower section of an accumulator 9. The discharge or suction end 10 of the coil 6 discharges directly into the bottom portion of the accumulator 9. The end of the suction line 7 within the accumulator 9 has an upturned end 11 therein so that there is a vertical break in the accumulator between the discharge end 10 of the coil 6 and the intake end 11 of the suction line 7. This break provides a level for accumulation of liquid refrigerant which, if it accumulates to the level indicated by the broken line 12 in the accumulator 9, a quantity of liquid refrigerant may be drawn through the metering device 13 to be discharged therefrom at a point adjacent the thermostatic bulb 14 which controls the operation of the expansion valve 5. Thus when liquid refrigerant is metered through the metering device 13, it will be discharged adjacent the bulb 14 and will close the expansion valve 5 due to the immediate lowering of the temperature thereof with the result that the liquid level indicated by the line 12 in the accumulator 9 will drop.

In order to maintain the expansion valve open so that in this case a full flooded condition of the coil 6 will be had, a heat exchanger 15 is utilized for heating the discharge refrigerant gases immediately in advance of the bulb 14 of the thermostatically controlled expansion valve 5. The heat exchanger in this case consists of coiling a section of the intake or high pressure line 4 by means of which the hot liquid refrigerant is delivered to the expansion valve around a section of the suction line 7 immediately adjacent the bulb 14 so that the hot liquid refrigerant provides the heat for maintaining the gaseous refrigerant heated and in a gaseous condition at this point. A secondary advantage is had by so utilizing the hot liquid for the source of heat in that the hot liquid refrigerant is cooled somewhat, adding to the efficiency of the operation of the refrigeration system.

It will be apparent from the foregoing that in the modification of my invention illustrated in Figure 1 that the coil 6 will be maintained in flooded condition at all times and that liquid refrigerant will accumulate in the accumulator 9 to a level determined by the metering device 13 and that at any time when the level seeks to rise above the metering device 13, that a quantity of liquid refrigerant will be delivered into the suction line 7 adjacent the bulb 14 with the result that the expansion valve will be closed. As soon as the excess quantity of liquid refrigerant is boiled in the system, the liquid refrigerant will drop to its normal level just below the inlet of the metering device 13.

In the modification of my invention illustrated in Figure 2, the principal difference is in the form of heat exchanger and accumulator used. In this modification heat is supplied to the gaseous refrigerant adjacent the position of the thermostatic bulb of the expansion valve 5a by means of liquid which may be normal tap water drawn from any suitable source and which ordinarily has an elevated temperature. The water or other cooling means employed may be taken from, and may be desired at, a lower temperature as, for example, a water cooler. In this case a coil of water pipe 15a may be immersed in the accumulator 9a. The refrigerant gas thus absorbs heat from the water and as that gas at an elevated temperature flows through the suction line 7a by the position occupied by the bulb 14a of the thermostatically controlled valve 5a, the thermostatically controlled valve 5a will be maintained open. The liquid refrigerant rises in the accumulator 9a to a point above the intake of the metering device 13a and the liquid will be aspirated through the metering device 13a and will be discharged in the suction line adjacent the bulb 14a with the result that the thermostat controlling the expansion valve will be actuated to close the expansion valve.

Many other sources of heat may be utilized for maintaining and assuring that the discharged gaseous refrigerant is maintained at the desired elevated temperature when passing through the suction line at the point adjacent the bulb 14 or 14a which operates the thermostat of the expansion valve.

The metering devices 13 and 13a utilized in each of the modifications of my invention constitute merely a small diameter pipe or an opening in the case of the modification shown in Figure 1 which would constitute a metering orifice of sufficient size to permit a controlled or metered flow of liquid refrigerant through the small diameter pipe or through the suction line 7 or 7a to the point where it will cool the bulb 14a operating the thermostat control for the expansion valve.

I have shown in each of the drawings a screen 16 and 16a covering the end of each of the small liquid delivery tubes incorporated in the metering devices 13 and 13a illustrated for the purpose of insuring that no solid might enter the said tubes or control devices which would tend to clog or prevent free passage of liquid therethrough.

The evaporator ordinarily accumulates frost, and the liquid level control embodying my invention is particularly adaptable for the control of the return of refrigerant to the compressor when the "hot gas" system of defrosting is employed. As illustrated in Figure 1, "hot gas" defrosting is accomplished by taking the hot refrigerant directly from the compressor with the evaporator through a valve-controlled defrosting line 20 which by-passes the condenser, receiver and expansion valve. In this case the hot gas is cooled in the evaporator due to the fact that the gas gives up heat to defrost the evaporator and some of the gas is cooled to a liquid refrigerant. The liquid refrigerant will be trapped in the accumulator 9 and is returned to the suction line 7 at a metered rate through the metering device 13, avoiding all possibility of returning liquid refrigerant to the compressor in "slugs" or in a manner detrimental to the compressor.

Having fully described my invention, it is to be understood that I do not wish to be limited to the details herein set forth, but my invention is of the full scope of the appended claims.

I claim:

1. In a liquid level control, the combination of a liquid refrigerant evaporator, a compressor, a condenser for the refrigerant compressed in the compressor, an expansion valve controlling the flow of the refrigerant to the evaporator from the condenser, means bypassing the condenser for delivering hot refrigerant gas to the evaporator from the compressor to defrost the evaporator, an accumulator having an inlet into which refrigerant passes from the evaporator, discharge means from the accumulator, there being maintained a gap between the inlets and outlets of the accumulator between which a level of liquid refrigerant may exist, a thermostat means for controlling the operation of the expansion valve, the heat responsive element of which is so positioned as to be subjected to the heated refrigerant after it leaves the accumulator, and means operable in accordance with the liquid refrigerant in the accumulator for delivering liquid refrigerant to the temperature responsive element of the thermostat to actuate the expansion valve to a closed position when the liquid level of liquid refrigerant in the accumulator rises above a predetermined point.

2. A liquid refrigerant level control for a refrigerant level control for a refrigerating system wherein a valve regulates the admission of liquid refrigerant into an evaporator and excess liquid refrigerant is discharged from the evaporator into an accumulator, the combination of: a major suction line communicating with the accumulator and having an intake end above its normal liquid level to withdraw gaseous refrigerant therefrom; a minor suction line having a metering intake end disposed at a predetermined level within said accumulator below the intake end of said major suction line and a discharge end within said major suction line spaced from said accumulator; and a temperature-sensitive means disposed in heat conductive relation with said major suction line adjacent the discharge end of said minor suction line and responsive to presence of refrigerant delivered through said minor suction line to close said valve thereby to limit further rise of liquid refrigerant in said accumulator.

3. In a refrigerating system wherein a valve regulates the admission of liquid refrigerant into an evaporator and excess liquid refrigerant is discharged from the evaporator into an accumulator, and wherein a suction line for gaseous refrigerant having an intake end above the normal liquid level in said accumulator communicates with the intake side of a refrigerant compressor, the combination of: a temperature-sensitive control for said valve disposed in heat conductive relation with said suction line at a location spaced from said accumulator; and a refrigerant-metering conduit having a restricted intake end located at a predetermined level in said accumulator and a discharge end adjacent said temperature-sensitive control within said suction line, said conduit tending to intake a limited quantity of liquid refrigerant for discharge in the region of said temperature-sensitive control to chill said control thereby to cause closure of said valve and limit further rise of liquid refrigerant in said accumulator.

4. In a refrigerating system wherein an expansion valve connected with a supply line of compressed gaseous refrigerant regulates the admission of refrigerant in a liquid state into an evaporator and excess liquid refrigerant is discharged from the evaporator into an accumulator, and wherein a suction line for low pressure gaseous refrigerant having an intake end above the normal liquid level in said accumulator communicates with the intake side of a refrigerant compressor, the combination of: a temperature-sensitive control for said valve disposed in heat conductive relation with said suction line at a location spaced from said accumulator; a refrigerant-metering conduit having a restricted intake end located at a predetermined level in said accumulator and a discharge end adjacent said temperature-sensitive control within said suction line, said conduit tending to intake a limited quantity of liquid refrigerant for discharge in the region of said temperature-sensitive control to chill said control thereby to cause closure of said valve and limit further rise of liquid refrigerant in said accumulator; and a heat-exchange means incorporating said supply line and said suction line to effect heat transfer to said suction line between said accumulator and said temperature-sensitive control.

References Cited in the file of this patent

UNITED STATES PATENTS

| | | |
|---|---|---|
| 2,116,100 | Crocknell | May 3, 1938 |
| 2,280,425 | Sanders | Apr. 21, 1942 |
| 2,405,448 | Ritter | Aug. 6, 1946 |
| 2,450,735 | Millet | Oct. 5, 1948 |
| 2,539,062 | Dillman | Jan. 23, 1951 |
| 2,614,402 | Swart | Oct. 21, 1952 |
| 2,624,181 | Erwin et al. | Jan. 6, 1953 |
| 2,675,683 | McGrath et al. | Apr. 20, 1954 |